US008345012B2

(12) United States Patent
Becker

(10) Patent No.: US 8,345,012 B2
(45) Date of Patent: Jan. 1, 2013

(54) METHOD AND INTERFACE DEVICE FOR OPERATING A SECURITY SYSTEM

(75) Inventor: Donald Edward Becker, Bradenton, FL (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 911 days.

(21) Appl. No.: 12/244,644

(22) Filed: Oct. 2, 2008

(65) Prior Publication Data
US 2010/0085310 A1    Apr. 8, 2010

(51) Int. Cl.
*G06F 3/02*    (2006.01)
(52) U.S. Cl. ........ 345/172; 345/168; 345/169; 345/170; 345/171
(58) Field of Classification Search ............... 345/440.1, 345/769, 771, 773, 835, 839, 965, 1.3, 473, 345/628, 781, 156–179; 702/57, 66, 67, 702/68.117; 382/114, 187; 455/566, 550.1, 455/414.1, 422.1; 715/204, 769, 771, 772, 715/854, 777
See application file for complete search history.

(56) References Cited

U.S. PATENT DOCUMENTS

| | | | | |
|---|---|---|---|---|
| 5,487,172 | A | | 1/1996 | Hyatt |
| 5,586,196 | A | * | 12/1996 | Sussman ........................ 382/114 |
| 5,734,915 | A | * | 3/1998 | Roewer .......................... 715/202 |
| 6,148,241 | A | * | 11/2000 | Ludtke et al. .................... 700/83 |
| 6,167,396 | A | * | 12/2000 | Lokken .......................... 707/737 |
| 6,556,221 | B1 | * | 4/2003 | Shima et al. .................... 715/764 |
| 6,570,592 | B1 | * | 5/2003 | Sajdak et al. ................... 715/769 |
| 6,611,241 | B1 | * | 8/2003 | Firester et al. .................. 345/1.3 |
| 6,628,297 | B1 | * | 9/2003 | Wraae et al. ................... 345/628 |
| 6,636,163 | B1 | * | 10/2003 | Hsieh ............................... 341/28 |
| 7,054,626 | B2 | * | 5/2006 | Rossmann .................. 455/422.1 |
| 7,797,379 | B2 | * | 9/2010 | Hawkins ........................ 709/203 |
| 7,827,476 | B1 | * | 11/2010 | Roberts et al. ................ 715/204 |
| 7,983,611 | B2 | * | 7/2011 | Rao .............................. 455/3.04 |
| 2001/0024195 | A1 | * | 9/2001 | Hayakawa ..................... 345/173 |
| 2002/0175948 | A1 | * | 11/2002 | Nielsen et al. ................. 345/781 |
| 2003/0069656 | A1 | | 4/2003 | Minami et al. |
| 2004/0125081 | A1 | * | 7/2004 | Hayakawa ..................... 345/156 |
| 2004/0162627 | A1 | | 8/2004 | Minami et al. |
| 2005/0025363 | A1 | * | 2/2005 | Lui et al. ........................ 382/187 |
| 2005/0043063 | A1 | * | 2/2005 | Dinn ............................... 455/566 |
| 2005/0140659 | A1 | * | 6/2005 | Hohl et al. ...................... 345/169 |
| 2005/0195221 | A1 | * | 9/2005 | Berger et al. .................. 345/660 |
| 2006/0010230 | A1 | * | 1/2006 | Karklins et al. ............... 709/223 |
| 2006/0139328 | A1 | * | 6/2006 | Maki et al. ..................... 345/161 |
| 2006/0229757 | A1 | | 10/2006 | Minami et al. |
| 2007/0198954 | A1 | * | 8/2007 | Dinn .............................. 715/864 |
| 2007/0229257 | A1 | * | 10/2007 | Bliding et al. ................. 340/566 |
| 2007/0257888 | A1 | * | 11/2007 | Chan .............................. 345/169 |
| 2008/0097712 | A1 | * | 4/2008 | Bruce et al. ...................... 702/77 |
| 2008/0119133 | A1 | * | 5/2008 | Rao .............................. 455/3.05 |
| 2008/0295017 | A1 | * | 11/2008 | Tseng et al. ................... 715/777 |
| 2009/0164519 | A1 | * | 6/2009 | Vainio ......................... 707/104.1 |
| 2009/0164910 | A1 | * | 6/2009 | Laakso et al. ................. 715/748 |
| 2009/0184801 | A1 | * | 7/2009 | Bliding et al. ................ 340/5.61 |
| 2009/0284482 | A1 | * | 11/2009 | Chin .............................. 345/173 |
| 2009/0310766 | A1 | * | 12/2009 | Ye ............................. 379/142.17 |
| 2010/0007665 | A1 | * | 1/2010 | Smith et al. ................... 345/473 |
| 2010/0148921 | A1 | * | 6/2010 | Bliding et al. ................. 340/5.7 |

* cited by examiner

*Primary Examiner* — Prabodh M Dharia
(74) *Attorney, Agent, or Firm* — MH2 Technology Law Group

(57) ABSTRACT

An interface device includes at least one programmable device and a display portion coupled to the at least one programmable device. The display portion is configured to convey a hierarchical relationship of a plurality of screen images that at least partially overlap each other. The hierarchical relationship includes the plurality of screen images defined in a series of logically related, ordered, and ranked groupings.

19 Claims, 6 Drawing Sheets

METHOD AND INTERFACE DEVICE FOR OPERATING A SECURITY SYSTEM

FIELD OF THE INVENTION

The embodiments described herein relate generally to configuring and operating security systems and, more particularly, to a method and interface device for configuring a security system to facilitate user operation during emergency conditions.

BACKGROUND OF THE INVENTION

Known security systems include a user interface and system architecture that typically presents a user with a plurality of multi-level, text-based menus. The text-based menus include a list of possible item selections, wherein each item on each menu represents a security system function. In the event that such menus are sufficiently plentiful, the menu architecture of such known security systems may also include a menu list. Moreover, the menu architecture may include at least one menu with a significant number of security system functions.

In operation of such known security systems, the user selects the desired function by navigating, or scrolling, the menu, or menus, with up and down arrow keys that are physically located close to the user interface or are virtually represented on the interface. A shortcut key is often provided that allows the user to jump directly to a function without scrolling. Since the menu expands in a single direction it is common for a portion of the menu to be hidden and only displayed once the user scrolls down far enough to uncover that portion of the menu. If the selected function displays a sub-menu, the original menu will be completely hidden as the sub-menu is displayed. Some known security systems include attempts to provide clues to users with respect to where they have navigated to within the user interface. Such clues are often provided as a level number and/or a menu number that are displayed at a fixed location on the screen. Moreover, some known security systems include touch screens, however, such screens typically require a larger footprint than non-touch screens and do not facilitate user navigation of a large number of hierarchal levels.

In emergency circumstances, such menu architectures as described above may be cumbersome to navigate to an inexperienced user and introduce a latency, or delay to the user's interface with the security system. Accordingly, it would be desirable to provide a method and/or an interface that is intuitive such that operation of a security system under stressful circumstances is facilitated.

BRIEF DESCRIPTION OF THE INVENTION

In one aspect, an interface device is provided. The interface device includes at least one programmable device and a display portion coupled to the at least one programmable device. The display portion is configured to convey a hierarchical relationship of a plurality of screen images that at least partially overlap each other. The hierarchical relationship includes the plurality of screen images defined in a series of logically related, ordered, and ranked groupings.

In another aspect, a security system is provided. The security system includes at least one programmable device programmed to generate a plurality of screen images. The security system also includes a plurality of alpha-numeric keys coupled to the at least one programmable device. The security system further includes a display portion coupled to the at least one programmable device. The display portion is configured to display the plurality of screen images such that at least one of the plurality of screen images is substantially representative of at least a portion of the plurality of alpha-numeric keys. The display portion is also configured to display the plurality of screen images such that at least a portion of each of the screen images is configured to at least one of partially overlap and be partially overlapped by at least one of another of the plurality of screen images. The plurality of screen images are configured to display a hierarchal relationship of the plurality of screen images. The hierarchical relationship comprises the screen images defined in a series of logically related, ordered, and ranked groupings.

In still another aspect, a method for operating a security system is provided. The method includes generating a first screen image on a display portion of an interface device. The method also includes depressing at least one alpha-numeric key on the interface device substantially corresponding to an icon on the first screen image. The method further includes generating a second screen image on the display portion that at least partially overlaps the first screen image such that a hierarchal relationship of the first and second screen images is visually generated. The hierarchical relationship includes the first and second screen images defined in a series of logically related, ordered, and ranked groupings.

The method and system described herein facilitate operation of a security system by creating an effective user interface device for the associated security system. By visually coordinating a plurality of soft buttons on an LCD display with a plurality of alpha-numeric keys facilitates the user intuitively associating the soft buttons on the display with the physical buttons on the numeric keypad. The method and interface device disclosed herein results in providing the user with a visual clue to the nesting of the operations and features that are being invoked within a menu hierarchy. A mixture of icons and text are used on the display to improve the ability of the user to quickly identify the function of the button without ambiguity, especially under stressful conditions during emergency circumstances.

BRIEF DESCRIPTION OF THE DRAWINGS

FIG. 1 is a block diagram of an exemplary security system.

FIG. 2 is an exemplary embodiment of a first user interface module that may be used with the security system shown in FIG. 1.

FIG. 3 is an exemplary embodiment of a second user interface module that may be used with the security system shown in FIG. 1.

FIG. 4 is an exemplary embodiment of an alpha-numeric keypad portion that may be used with the first and second user interface modules shown in FIGS. 2 and 3, respectively.

FIG. 5 is an exemplary embodiment of a navigation keypad portion that may be used with the first and second user interface modules shown in FIGS. 2 and 3, respectively.

FIG. 6 is an exemplary embodiment of a first screen image that may be used with the first and second user interface modules shown in FIGS. 2 and 3, respectively.

FIG. 7 is an exemplary embodiment of a second screen image that may be used with the first and second user interface modules shown in FIGS. 2 and 3, respectively.

FIG. 8 is an exemplary embodiment of a third screen image that may be used with the first and second user interface modules shown in FIGS. 2 and 3, respectively.

DETAILED DESCRIPTION OF THE INVENTION

Figure 1:
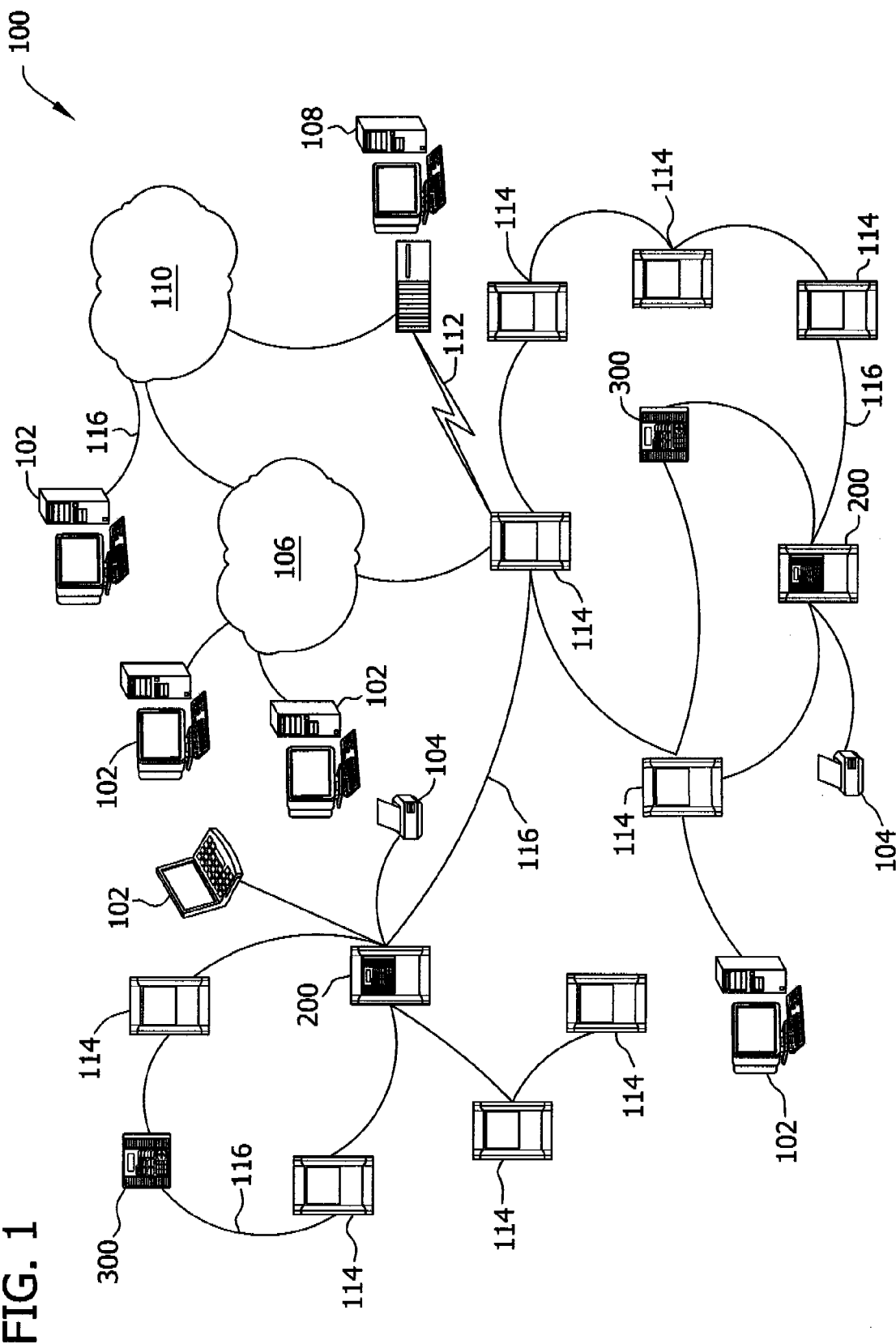
FIGS. 1-8 show exemplary embodiments of the interface devices, systems, and methods described herein.

The method and interface device described herein facilitate operation of security systems. Such security systems include a user interface that includes a color LCD display combined with an alpha-numeric keypad and a navigation keypad and create an effective user interface device for the associated security system. Specifically, the LCD display includes a plurality of soft buttons, the keypad includes a plurality of alpha-numeric keys, and the navigation keypad includes up, down, left, and right arrow keys. Both the soft buttons and the keys are spatially arranged such that the user will intuitively associate the soft buttons on the display with the physical buttons on the numeric keypad. Also, specifically, the functions associated with the soft buttons are invoked by depressing the associated alpha-numeric keypad buttons. Moreover, the user may navigate around the soft buttons with the up, down, left, and right arrow keys, wherein depressing the selection, or enter key will invoke the function associated with the highlighted soft button. When a function is invoked a new window will be opened overlaid on the existing window with a small offset. The method and interface device disclosed herein results in providing the user with a visual clue to the nesting of the operations that are being invoked within the menu hierarchy. A mixture of icons and text are used on the display to improve the ability of the user to quickly identify the function of the button without ambiguity, especially under stressful conditions during emergency circumstances.

A technical effect of the interface device and method described herein is to provide the user of the security system described herein with user interface features arranged such that the user's own intuitive abilities to spatially arrange information are leveraged. This ability to rely on the user's inherent ability to spatially organize information facilitates navigation through the security system and the associated menu hierarchy intuitively, quickly, and easily. Embodiments of security systems described herein include overlapping graphics that provide the information that the user needs to understand where they are within the hierarchy of the user interface device. Also, embodiments of the security systems described herein include nested soft button windows that provide the user with the clues needed to orient themselves spatially within the user interface hierarchy, thereby further facilitating security system navigation.

At least one embodiment of the present invention is described below in reference to its application in connection with and operation of a security system for monitoring, alarming, and notification. However, it should be apparent to those skilled in the art and guided by the teachings provided herein that a plurality of embodiments of the invention are likewise applicable to any suitable system requiring a user interface with a small footprint and intuitive navigation features.

Many of the components of the security systems described herein include at least one processor and a memory, at least one processor input channel, and at least one processor output channel. As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but not be limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The processors as described herein process information transmitted from a plurality of electrical and electronic devices that may include, but not be limited to, security system monitoring devices such as smoke detectors. Such processors may be physically located in, for example, but not limited to, the security monitoring devices, desktop computers, laptop computers, PLC cabinets, and distributed control system (DCS) cabinets. RAM and storage devices store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident security system control commands. The execution of sequences of instructions is not limited to any specific combination of hardware circuitry and software instructions.

FIG. 1 is a block diagram of an exemplary security system 100. In the exemplary embodiment, security system 100 includes features such as, but not limited to, intrusion detection features, access control features, fire detection features, fire suppression features, mass notification features, and any other features typically associated with life safety systems. Security system 100 includes a plurality of work stations 102 that include, but are not limited to, desk top computers, laptop computers, servers, and hand-held devices, such as personal data assistants (PDAs), that perform system and network functions that include, but are not limited to, diagnostics, reporting, technical support, configuration, system and network security, and communications. Security system 100 also includes a plurality of printers 104. Security system 100 is coupled with other systems and networks (neither shown) via a corporate local area network (LAN) or Wide Area Network (WAN) 106. Moreover, security system 100 is coupled with other systems and networks including, but not limited to, a remote central monitoring station 108 via the Internet 110 and/or a radio communications link 112. In alternative embodiments, any network configuration using any communication coupling is used.

Security system 100 further includes a plurality of panels 114 with features that include, but are not limited to, localized system troubleshooting nodes and wiring and cable terminations. Security system 100 also includes a plurality of system interface devices, more specifically a plurality of first user interface devices, or modules 200 and a plurality of second user interface devices, or modules 300, wherein modules 200 and 300 are discussed further below. In the exemplary embodiment, work stations 102, printers 104, LAN/WAN 106, Internet 110, panels 114, modules 200, and modules 300 are coupled via conduits 116 that include, but are not limited to, CAT-5(e) and CAT-6 network cabling and wireless radio frequency channels.

Figure 2:
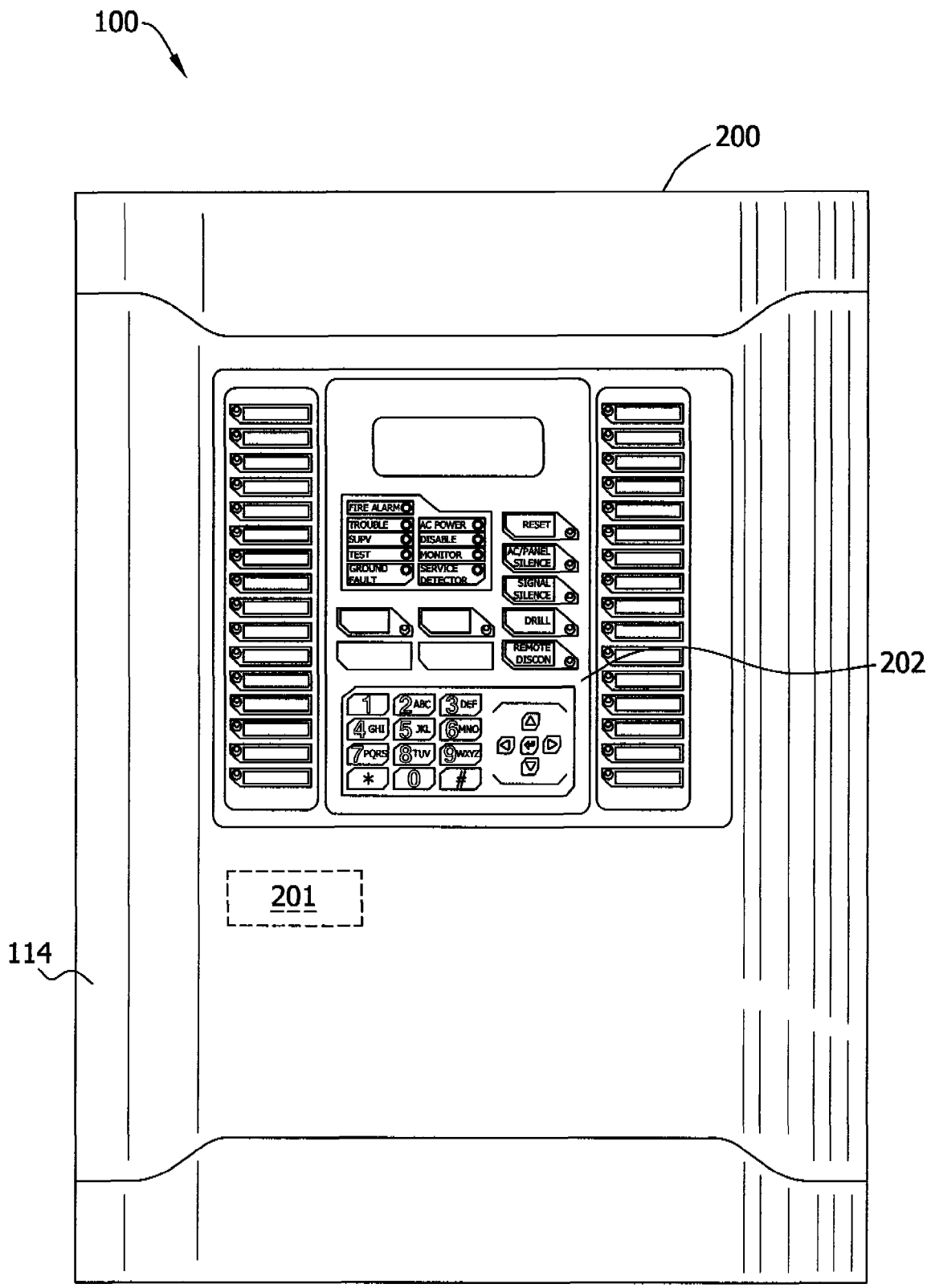
Figure 3:
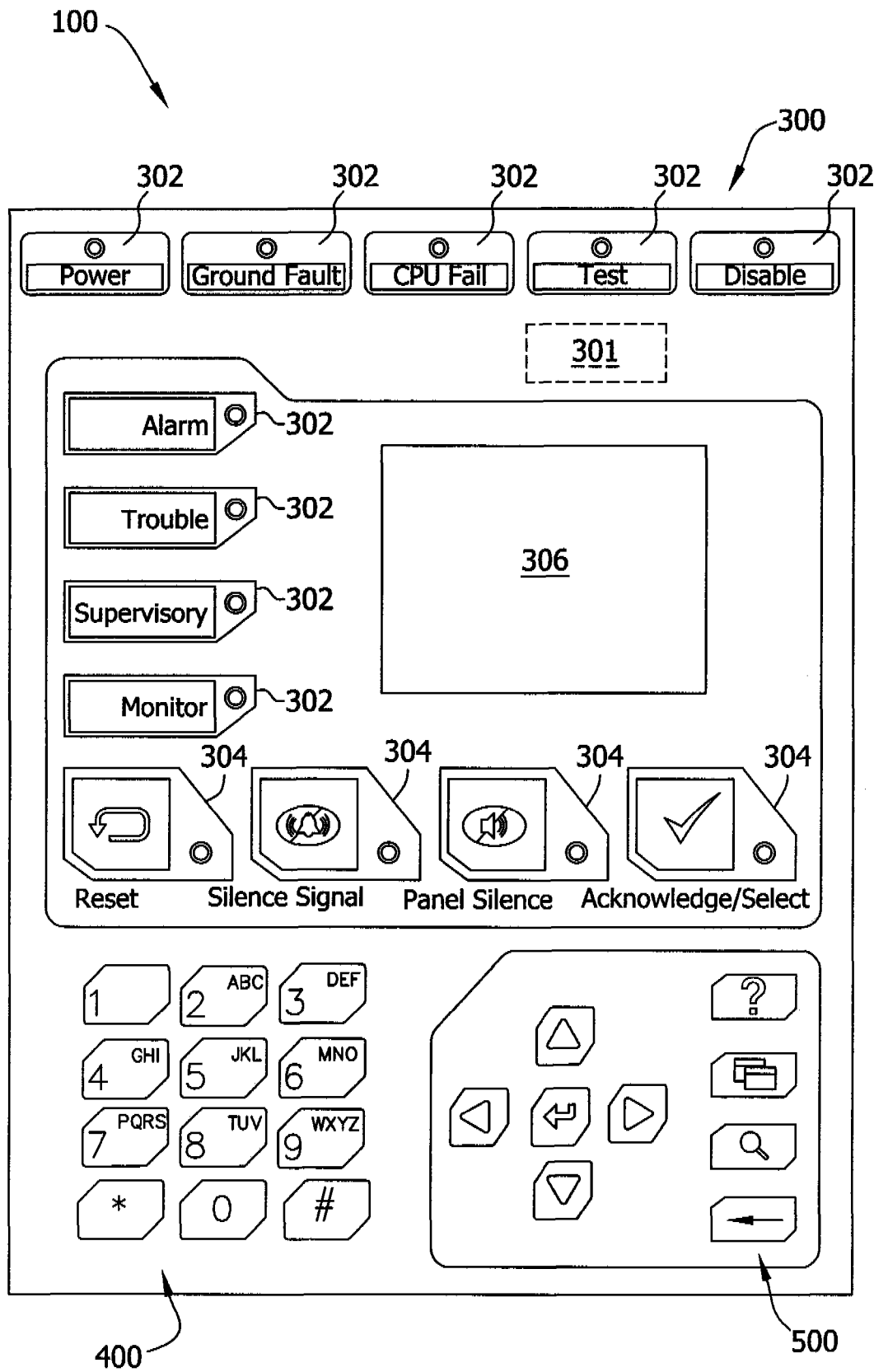

FIG. 2 is an exemplary embodiment of first user interface module 200 that may be used with security system 100 (shown in FIG. 1). FIG. 3 is an exemplary embodiment of second user interface module 300 that may be used with security system 100. Module 200 includes a user interface panel 202, wherein panel 202 is similar to module 300. Module 300 is discussed in detail below and unless otherwise noted, the features of module 300 are included within panel 202. Module 200 also includes at least a portion of the features of panel 114 as described above.

In the exemplary embodiment, modules 200 and 300 include programmable devices, including, but not limited to, embedded flash memory-based firmware 201 and 301, respectively. Such firmware 201 and 301 is programmed with sufficient static and/or dynamic instructions to facilitate independent processing operations. That is, each of modules 200 and 300 is programmed to function as a substantially stand-alone component upon completion of configuration activities within security system 100. Moreover, modules 200 and 300 are programmed to facilitate integration with other processors (not shown) within security system 100. Alternatively, any programmable devices may be embedded within modules 200 and 300.

Module 300 includes a plurality of indicating lamps 302 that include, but are not limited to, light emitting diode (LED) lamps 302 for features and/or conditions that include, but are not limited to, module electric power availability and/or module energization, module ground faults, module central processing unit (CPU) failures, module testing, module enabling and disabling, as well as the existence of system alarms, system trouble notifications, system supervisory notifications, and system monitor notifications. Module 300 also includes a plurality of user command buttons 304 that include, but are not limited to, panel reset, system alarm silencing, panel alarm silencing, and alarm/notification acknowledgement and selection.

Module 300 further includes a display portion 306 that is illuminated with screen images as discussed further below. In the exemplary embodiment, display portion 306 is a color liquid crystal display (LCD). Moreover, in the exemplary embodiment, display portion 306 has a diagonal dimension of approximately 8.89 centimeters (cm) (3.5 inches (in)). Alternatively, any display technology of any size that facilitates operation of system 100 as described herein is used. Display portion 306 uses a combination of color selection, graphics design, and text selection to facilitate operation of security system 100. Module 300 also includes an alpha-numeric keypad portion 400 and a navigation keypad portion 500. Keypads 400 and 500 are discussed further below.

Figure 4:
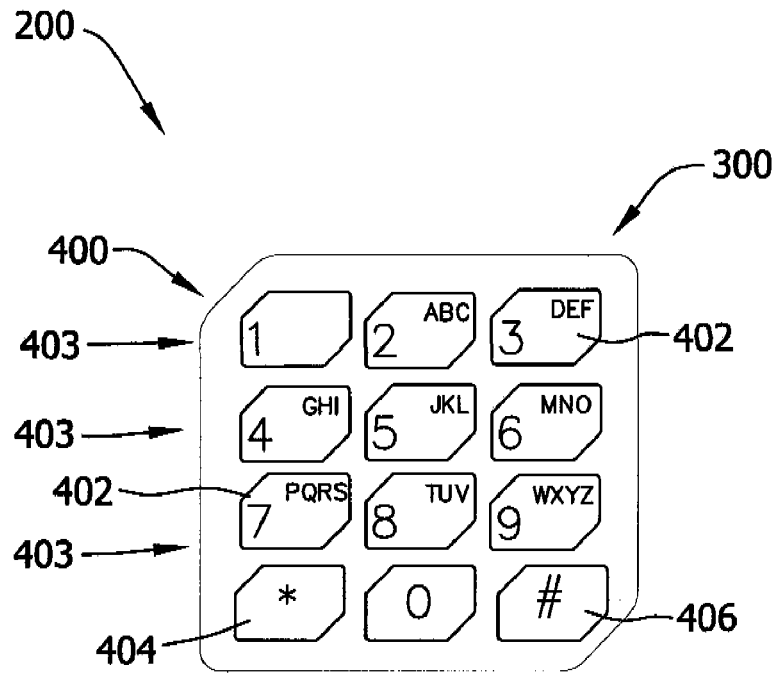

FIG. 4 is an exemplary embodiment of alpha-numeric keypad portion 400 that may be used with first and second user interface modules 200 and 300, respectively (shown in FIGS. 2 and 3, respectively). Keypad portion 400 includes a plurality of alpha-numeric keys 402 in a configuration that is substantially similar to a standard telephone keypad (not shown) configuration. Most notably, keypad portion 400 includes three rows 403 of three alpha-numeric keys 402 per row 403, with numerals "1" through "9". Keypad portion 400 also includes a star, or "*" key 404 and a pound, or "#" key 406. Keys 402, 404, and 406 are configured to interface with the screen images (not shown in FIG. 4) displayed on display portion 306 (shown in FIG. 3). Alternatively, keypad portion 400 has any configuration that facilitates operation of security system 100 as described herein.

Figure 5:
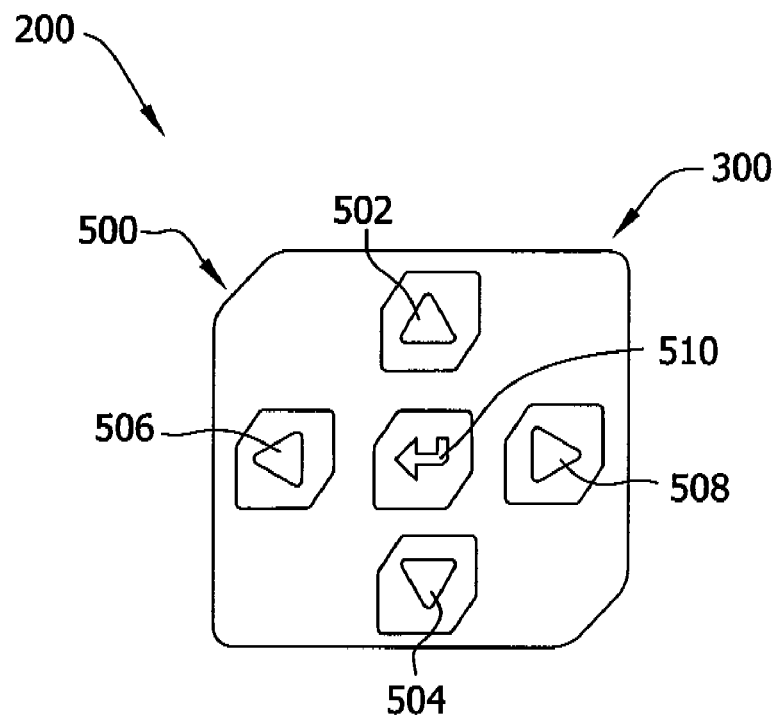

FIG. 5 is an exemplary embodiment of navigation keypad portion 500 that may be used with first and second user interface modules 200 and 300, respectively (shown in FIGS. 2 and 3, respectively). Keypad portion 500 includes a plurality of navigation keys, or more specifically, an up arrow key 502, a down arrow key 504, a left arrow key 506, a right arrow key 508, and a selection, or enter key 510. Keys 502, 504, 506, 508, and 510 are configured to interface with the screen images displayed on display portion 306 (shown in FIG. 3). Alternatively, keypad portion 500 has any configuration that facilitates operation of security system 100 as described herein.

Figure 6:
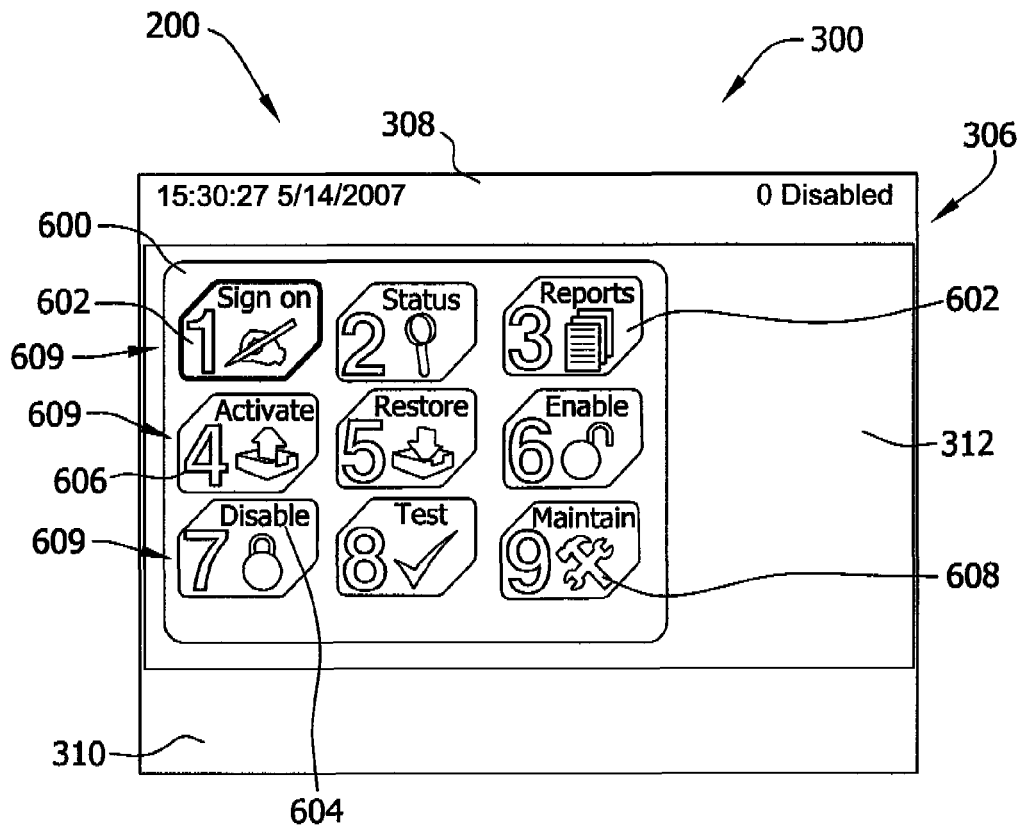

FIG. 6 is an exemplary embodiment of a first screen image 600 that may be used with first and second user interface modules 200 and 300, respectively (shown in FIGS. 2 and 3, respectively). Display portion 306 includes three distinct regions. Specifically, in the exemplary embodiment, display portion 306 includes a general status region 308 that displays general information such as, but not limited to, the date, the time, and the number of disabled devices in security system 100 (shown in FIG. 1). Alternatively, region 308 displays any information that facilitates operation of security system 100 as described herein. Also, specifically, in the exemplary embodiment, display portion 306 includes a system status region 310 that displays system information that includes, but is not limited to, active portions of security system 100. Alternatively, region 310 displays any information that facilitates operation of security system 100 as described herein. Further, specifically, in the exemplary embodiment, display portion 306 includes a screen image region 312 that displays screen images such as, but not being limited to, screen image 600.

In the exemplary embodiment, first screen image 600 includes a plurality of icons, or soft buttons 602 that include, but are not limited to, user sign on, system status, system reports, system activation, system restoration, system enablement, system disablement, system testing, and system maintenance. Alternatively, image 600 includes any features of security system 100 that facilitate operation of security system 100 as described herein. Each soft button 602 includes an alpha-numeric title 604, a numeral 606 corresponding to a numeral on alpha-numeric keypad portion 400, and a symbolic representation 608 of title 604. Soft buttons 602 are oriented into three rows 609 of three alpha-numeric keys 602 per row 609, with numerals "1" through "9" oriented in a manner substantially similar to that orientation of keys "1" through "9" within rows 403 on keypad portion 400, thereby facilitating a visual relationship of substantial identically between keypad portion 400 and image 600 for a user.

Figure 7:
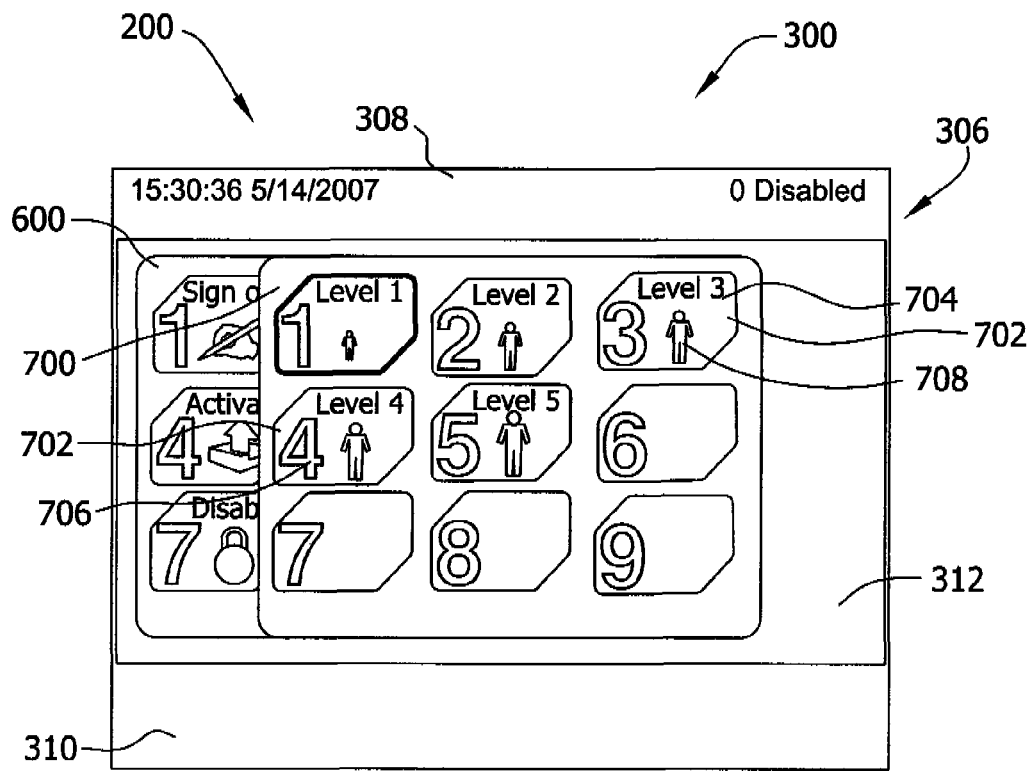

FIG. 7 is an exemplary embodiment of a second screen image 700 that may be used with first and second user interface modules 200 and 300, respectively (shown in FIGS. 2 and 3, respectively). In the exemplary embodiment, second screen image 700 includes a plurality of icons, or soft buttons 702 that include, but are not limited to, predefined system levels. Specifically, soft buttons 702 are in a hierarchal relationship, wherein the system levels are defined in a series of logically related, ordered, and ranked groupings of features of security system 100 embodied within a series of logically related, ordered, and ranked groupings of screen images. More specifically, the system levels are in a hierarchal relationship with respect to, but not being limited to, user security clearance and technical segregation of security system 100. Alternatively, image 700 includes any features of security system 100 that facilitate operation of security system 100 as described herein.

In the exemplary embodiment, in order to facilitate such a hierarchal relationship, each soft button 702 includes an alpha-numeric title 704, a numeral 706 corresponding to a numeral on alpha-numeric keypad portion 400, and a symbolic representation 708 of title 704. Soft buttons 702 with numerals "1" through "9" are oriented in a manner substantially similar to that orientation of keys "1" through "9" on keypad portion 400, thereby facilitating a visual relationship between keypad portion 400 and image 700 for a user. To further facilitate a visual relationship between all screen images and keypad portion 400, screen image 700 has substantially the same dimensions and same soft button orientation as screen image 600.

Figure 8:
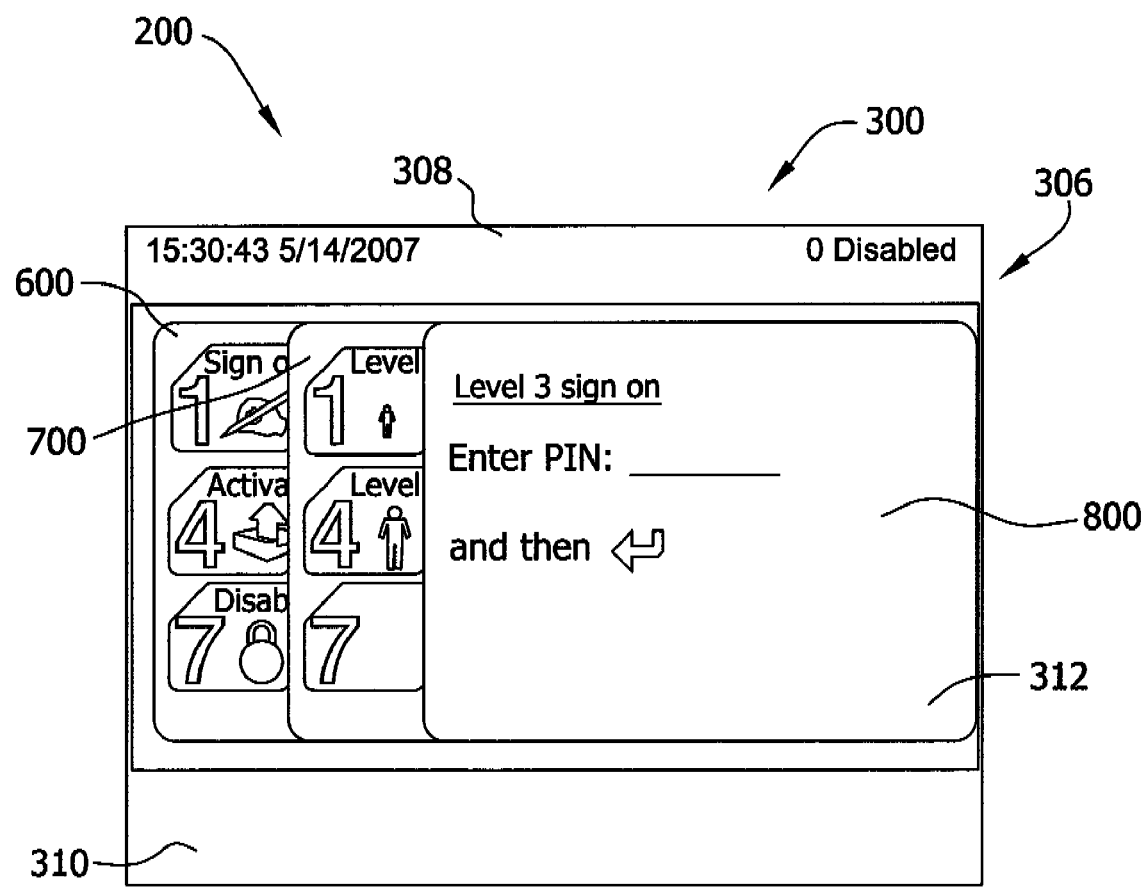

FIG. 8 is an exemplary embodiment of a third screen image 800 that may be used with first and second user interface modules 200 and 300, respectively (shown in FIGS. 2 and 3, respectively). In the exemplary embodiment, screen 800 is a security sign-on image for Level 3 users, wherein Level 3 users are at least partially defined by logically related, ordered, and ranked groupings of features of security system 100 associated with, and embodied within, a series of logically related, ordered, and ranked groupings of screen images. More specifically, Level 3 users include attributes such as, but not limited to, a predetermined user security clearance and predetermined operational and technical limitations within the segregated scheme of security system 100.

Alternatively, screen image 800 includes any image that facilitates operation of security system 100 as described herein. To further facilitate a visual relationship between all screen images and keypad portion 400, screen image 800 has substantially the same dimensions and same soft button orientation (if soft buttons are included with image 800) as screen images 600 and 700. Moreover, such visual relationship further facilitates a user's intuitive sense of a hierarchal relationship between screen image 800, a portion of screen image 700, and a portion of screen image 600. Specifically, screen image 800 is a part of the hierarchal relationship with a portion of each of screen images 600 and 700, wherein screen images 600, 700, and 800 at least partially define a series of logically related, ordered, and ranked groupings of features of security system 100. More specifically, in the exemplary embodiment, screen image 800 at least partially defines the hierarchal relationship with respect to user security clearance for security system 100.

An exemplary method for operating security system 100 includes generating a first screen image 600 on a display portion 306 of interface device, or module 300. The method also includes depressing at least one alpha-numeric key 402 on module 300 substantially corresponding to an icon, or soft button 602 on first screen image 600. The method further includes generating second screen image 700 on display portion 306 that at least partially overlaps first screen image 600 such that a hierarchal relationship of first and second screen images 600 and 700, respectively, is visually generated. The hierarchical relationship includes first 600 and second 700 screen images defined in a series of logically related, ordered, and ranked groupings.

In operation, in the exemplary embodiment, a user initiates interface operations with security system 100 by selecting one of soft buttons 602 on first screen image 600. In the exemplary embodiment, screen image 600 is the default image for modules 200 and 300 when they are left idle for a predetermined period of time. Alternatively, modules 200 and 300 are configured with any initial screen image. When first displayed, the upper left soft button 602 of image 600 will be highlighted such that the user's sight is drawn to that soft button 602.

The user has two options for navigating security system 100's menu architecture. The first option includes leveraging the visual similarities between keys 402 with numerals "1" through "9" on keypad portion 400 and numerals 606 "1" through "9" on screen image 600 and depressing the associated key 402 on keypad portion 400. For example, to select the test features of security system 100, the user will depress the key 402 with an "8" on it. The second option includes depressing up arrow key 510, down arrow key 504, left arrow key 506, and right arrow key 508 on keypad portion 500 to move the soft button highlight from soft button 602 to soft button 602 on screen image 600. The soft button 602 that is highlighted is the function that will be invoked when enter key 510 on keypad portion 500 is depressed. The first option is the quicker, more direct method of the two for navigating the image screens throughout the menu hierarchy of security system 100.

Selection of the desired soft button 602, using one of the two options as described above, invokes the associated function or feature, such that second screen image 700 is displayed on display portion 306. Screen image 700 is positioned within display portion 306 such that it overlays on screen image 600 and partially overlaps screen image 600. The offset is vertical, horizontal, or both, such that a portion of screen image 600 remains visible to the user. This feature of security system 100 facilitates providing the user with an intuitive perspective as to the hierarchal relationship of screen image 700 with respect to screen image 600, that is, where the user is currently residing within the menu architecture of security system 100. Such an intuitive perspective facilitates operation of the desired features of security system 100 while facilitating subsequent user transiting through the menu architecture. In a manner substantially similar to that associated with screen image 600, when first displayed, the upper left soft button 702 of image 700 will be highlighted such that the user's sight is drawn to that soft button 702. Selection of the desired soft button 702 is made by either of the two options described above. Subsequent navigation through screen images in security system 100 is performed in substantially the same manner.

Such method of navigation through security system 100 provides an intuitive perspective of such navigation to the user. This is important for security systems that are similar to security system 100 and include fire detection and alarm features, and where user/system interactions are infrequent and the user is typically under stress while interacting with the system. User interface modules 200 and 300 facilitate navigation because of the visual clues that facilitate spatially associating numeric keys 402 on keypad portion 400 with soft buttons 602 displayed on the screen images. Moreover, the predetermined use and combination of color, graphics, text, and spatial association with alpha-numeric keypad portion 400 facilitates quicker navigation of security system 100. Furthermore, user interface modules 200 and 300 with display portion 306 and screen images similar to images 600 and 700 facilitate nesting soft buttons 602 and 702, respectively, close together, thereby decreasing the footprint of the display portion and making touch screen technology, with the associated costs and size, impractical and unnecessary.

The above-described interface device and method for operating a security system facilitate improving user operation of the security system in stressful circumstances. Such security systems include a user interface that includes a color LCD display combined with an alpha-numeric keypad and a navigation keypad create an effective user interface for the associated security system. Specifically, the LCD display includes a plurality of soft buttons, the keypad includes a plurality of alpha-numeric keys, and the navigation keypad includes up, down, left, and right arrow keys. Both the soft buttons and the keys are spatially arranged such that the user will intuitively associate the soft buttons on the display with the physical buttons on the numeric keypad. Also, specifically, the functions associated with the soft buttons are invoked by depressing the associated alpha-numeric keypad buttons. Moreover, the user may navigate around the soft buttons with the up, down, left, and right arrow keys, wherein depressing the enter key will invoke the function associated with the highlighted soft button. When a function is invoked a new window will be opened overlaid on the existing window with a small offset. The method and interface device disclosed herein results in providing the user with a visual clue to the nesting of the operations that are being invoked within the menu hierarchy. A mixture of icons and text are used on the display to improve the ability of the user to quickly identify the function of the button without ambiguity, especially under stressful conditions during emergency circumstances. Moreover, there is a cost advantage to the security system as described herein because the security system may be scaled with less hardware, that is with fewer physical buttons, Furthermore, the security system as described herein may be scaled with less programming code, that is with fewer menu levels and functions, thereby facilitating less post-commissioning user training and lower maintenance costs.

Exemplary embodiments of methods and interface devices for operating a security system are described above in detail. The methods and interface devices are not limited to the specific embodiments described herein, but rather, components of systems and/or steps of the methods may be utilized independently and separately from other components and/or steps described herein. For example, the methods may also be used in combination with other security systems and methods, and are not limited to practice with only the security systems as described herein. Rather, the exemplary embodiment can be implemented and utilized in connection with many other security system applications.

While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An interface device comprising:
at least one programmable device;
a display portion coupled to said at least one programmable device, said display portion configured to convey a hierarchical relationship of a plurality of screen images that at least partially overlap each other, wherein said hierarchical relationship comprises said plurality of screen images defined in a series of logically related, ordered, and ranked groupings, wherein each of said plurality of screen images comprises at least one soft button; and
a plurality of physical alpha-numeric keys coupled to said at least one programmable device;
wherein at least one of said plurality of screen images comprises a set of soft buttons arranged in the same layout, and having the same functions at the same time, as said plurality of physical alpha-numeric keys, wherein each soft button is configured to be activated by touching a corresponding location on the screen image.

2. An interface device in accordance with claim 1 wherein each of said plurality of screen images comprises at least one soft button having a numeral displayed thereon.

3. An interface device in accordance with claim 2, wherein said plurality of physical alpha-numeric keys comprises at least one physical alpha-numeric key having a numeral imprinted thereon, wherein said at least one physical alpha-numeric key having a numeral imprinted thereon and said at least one soft button having a numeral imprinted thereon comprise a combination of a physical alphanumeric key and a soft button having substantially the same numeral imprinted thereon.

4. An interface device in accordance with claim 3 wherein said at least one physical alpha-numeric key having a numeral imprinted thereon comprises at least nine physical alpha-numeric keys oriented into three rows of physical alpha-numeric keys, wherein each row comprises three physical alpha-numeric keys.

5. An interface device in accordance with claim 4 wherein said at least one soft button having a numeral imprinted thereon comprises at least nine soft buttons oriented into three rows of soft buttons, wherein each row comprises three soft buttons.

6. An interface device in accordance with claim 5 further comprising a navigation keypad comprising a plurality of navigation keys configured to select said at least one soft button having a numeral imprinted thereon.

7. A security system comprising:
at least one programmable device programmed to generate a plurality of screen images;
a plurality of physical alpha-numeric keys coupled to said at least one programmable device; and
a display portion coupled to said at least one programmable device configured to display said plurality of screen images such that:
at least one of said plurality of screen images having soft buttons with the same layout, and having the same functions at the same time, as said plurality of physical alpha-numeric keys, wherein each soft button is configured to be activated by touching a corresponding location on the screen image; and
at least a portion of each of said plurality of screen images is configured to at least one of partially overlap or be partially overlapped by at least one of another of said plurality of screen images, wherein said plurality of screen images is configured to display a hierarchal relationship of said plurality of screen images, wherein said hierarchical relationship comprises the screen images defined in a series of logically related, ordered, and ranked groupings.

8. A security system in accordance with claim 7 wherein said plurality of physical alpha-numeric keys comprises at least one physical alpha-numeric key having a numeral imprinted thereon.

9. A security system in accordance with claim 8 wherein each of said plurality of screen images comprises at least one soft button having a numeral displayed thereon.

10. A security system in accordance with claim 9 wherein said at least one physical alpha-numeric key having a numeral displayed thereon and said at least one soft button having a numeral imprinted thereon comprise a combination of a physical alphanumeric key and a soft button having substantially the same numeral imprinted thereon.

11. A security system in accordance with claim 10 wherein said at least one physical alpha-numeric key having a numeral displayed thereon comprises at least nine physical alpha-numeric keys oriented into three rows of physical alpha-numeric keys, wherein each row comprises three physical alpha-numeric keys.

12. A security system in accordance with claim 11 wherein said at least one soft button having a numeral displayed thereon comprises at least nine soft buttons oriented into three rows of soft buttons, wherein each row comprises three soft buttons.

13. A method for operating a security system, said method comprising:
    generating a first screen image on a display portion of an interface device, wherein the interface device comprises a plurality of physical alpha-numeric keys, and wherein the first screen image comprises a set of soft buttons arranged in the same layout, and having the same functions at the same time, as said plurality of physical alpha-numeric keys, wherein each soft button is configured to be activated by touching a corresponding location on the screen image;
    receiving a signal indicating a depression of at least one physical alpha-numeric key on the interface device substantially corresponding to an icon on the first screen image; and
    generating a second screen image on the display portion that at least partially overlaps the first screen image such that a hierarchal relationship of the first and second screen images is visually generated, wherein the hierarchical relationship includes the first and second screen images defined in a series of logically related, ordered, and ranked groupings.

14. A method in accordance with claim 13 wherein generating a first screen image on a display portion of an interface device comprises generating a first screen image including at least one soft button.

15. A method in accordance with claim 14 wherein generating a first screen image including at least one soft button comprises generating a plurality of soft buttons, wherein at least one soft button of the plurality of soft buttons includes a numeral imprinted thereon.

16. A method in accordance with claim 15 wherein generating a plurality of soft buttons comprises generating at least nine soft buttons oriented into three rows of soft buttons, wherein each row comprises three soft buttons and at least one soft button of the plurality of soft buttons includes a numeral imprinted thereon.

17. A method in accordance with claim 16 wherein depressing at least one key on an alpha-numeric keypad portion of the interface device comprises depressing a physical alpha-numeric key having a numeral imprinted thereon, wherein the at least one soft button that includes a numeral displayed thereon and the depressed physical alpha-numeric key having a numeral imprinted thereon have substantially the same numeral imprinted thereon.

18. A method in accordance with claim 17 wherein generating a second screen image on the display portion comprises:
    generating a second screen image including at least one soft button having a numeral displayed thereon; and
    depressing a physical alpha-numeric key having a numeral imprinted thereon, wherein the at least one soft button on the second screen image and the depressed physical alpha-numeric key have substantially the same numeral.

19. A method in accordance with claim 13 further comprising:
    depressing at least one navigation key on a navigation keypad;
    highlighting a soft button located on the first screen image; and
    depressing a selection key on the navigation keypad, thereby selecting the highlighted soft button located on the first screen image.

\* \* \* \* \*